United States Patent [19]
Uchiyama et al.

[11] Patent Number: 5,780,796
[45] Date of Patent: Jul. 14, 1998

[54] MOUNTING CONSTRUCTION OF A COMBINATION SWITCH

[75] Inventors: Norio Uchiyama; Yoshio Hattori, both of Tokyo, Japan

[73] Assignee: Niles Parts Co., Ltd., Japan

[21] Appl. No.: 845,459

[22] Filed: Apr. 25, 1997

[30] Foreign Application Priority Data

May 13, 1996 [JP] Japan ..................... 8-141133

[51] Int. Cl.$^6$ ..................... H01H 9/00
[52] U.S. Cl. ..................... 200/61.54
[58] Field of Search ............ 74/492, 498, 484 R, 74/552; 116/31, 284, 294; 180/255; 200/4, 61.27, 61.3–61.36, 61.54, 293, 295; 280/728.2, 750, 771; 307/10.1; 403/326, 359, 364; 439/15, 21, 164, 165

[56] References Cited

U.S. PATENT DOCUMENTS

| | | | |
|---|---|---|---|
| 3,766,351 | 10/1973 | Cryer | 200/61.54 |
| 4,081,634 | 3/1978 | Bull | 200/61.27 |
| 4,277,658 | 7/1981 | Delp et al. | 200/61.54 |
| 4,336,428 | 6/1982 | Berginski | 200/61.54 |
| 4,404,438 | 9/1983 | Honjo | 200/61.54 |
| 4,649,768 | 3/1987 | Kusaka et al. | 74/484 R |
| 5,704,633 | 1/1998 | Durrani et al. | 280/728.2 |
| 5,714,727 | 2/1998 | Lecznar et al. | 200/61.54 |

FOREIGN PATENT DOCUMENTS

HEI2-120721  9/1990  Japan ................. H01H 9/02

*Primary Examiner*—Michael A. Friedhofer
*Attorney, Agent, or Firm*—Rader, Fishman & Grauer

[57] ABSTRACT

A mounting construction which improves the mounting operation of a combination switch (3) to a steering column (1) of an automobile. The mounting construction includes a bracket (2) provided with two integral fastening projections (23, 23) which extend parallel to the steering column (1) from a key cylinder (22) of an ignition switch, and an integral threaded hole (24) located above the steering column (1). The fastening projections (23, 23) each have a first longitudinal projection (25) and a recess (26). A trapezoidal-shaped base (4) of the combination switch (3) has an insertion hole (41) in the middle of an upper side and two fitting holes (42, 42) on a lower side. The fitting holes (42, 42) are through-holes which extend parallel to the steering column (1) and into which the fastening projections (23, 23) of the bracket (2) are fitted. A resilient hook (43) and a second longitudinal projection (44) are provided in each of the fitting holes (42, 42). The resilient hooks (43, 43) are engaged with the recesses (26), (26) in each of the fastening projections (23, 23), and the second longitudinal projection (44) abuts the first longitudinal projection (25). A screw (7) is inserted through the insertion hole (41) and threaded into the threaded hole (24), thereby firmly fixing the base (4) of the combination switch to the bracket (2).

10 Claims, 3 Drawing Sheets

MOUNTING CONSTRUCTION OF A COMBINATION SWITCH

BACKGROUND OF THE INVENTION

1. Field of the Invention

The present invention relates generally to combination switches and, in particular, to a mounting construction for mounting a combination switch to a steering column of an automobile.

2. Description of the Related Art

A conventional mounting construction for mounting a combination switch to the steering column of an automobile is disclosed, for example, in Japanese Utility Model Publication No. Hei 2-120721.

With this conventional mounting construction, switch units incorporating the turn signal switches and wiper switch are fixedly mounted by means of screws or bolts, for example, to a base having a through-hole formed in the middle thereof through which a steering column is to extend. During assembly, the base is first inserted such that the tip of the steering column extends into the through-hole, and then the base is bolted at three locations to the bracket secured to the steering column by welding, for example.

However, the conventional construction is disadvantageous in that when mounting the base of the combination switch to the bracket, the three bolts must be tightened while at the same time holding the combination switch at an exact position. This makes the assembly operation difficult and inefficient.

SUMMARY OF THE INVENTION

It is an object of the present invention to provide a mounting construction for mounting a combination switch that solves the problems associated with the conventional mounting construction described above.

It is a further object of the present invention to provide a mounting construction which enables a combination switch to be mounted easily and efficiently.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to solve the problems described above, a mounting construction is provided for mounting a combination switch to a bracket fixed to the steering column of an automobile. The bracket is provided with a fastening hole and a pair of fastening projections. The fastening hole and the fastening projections extend in a direction parallel to the steering column. The base of the combination switch is formed with fitting holes into which the fastening projections of the bracket are fitted, and an insertion hole which corresponds to the fastening hole of the bracket. Then, the combination switch is fixed to the bracket by inserting a single fastening member through the insertion hole of the combination switch and then fastening the fastening member to the fastening hole of the bracket. This provides an efficient assembly operation with a minimum number of fastening locations after positioning the components by means of the fastening projections and fitting holes.

The fastening projections of the bracket are preferably formed with recesses, and resilient hooks are formed in the fitting holes of the combination switch for engaging the recesses. Therefore, when the fastening projections are assembled to extend into the combination switch, the resilient hook engages the fastening recess. This ensures that the combination switch and steering column are assembled together provisionally, and subsequently the combination switch can be fixed to the steering column without using other fastening members.

The fastening projections of the bracket are preferably each formed with a first guide extending longitudinally on an opposite side of the projection from the fastening recess. A second guide is formed on a wall of each of the fitting holes in the combination switch, whereby the second guide abuts the first guide when assembled. This construction allows the first and second guides to have small areas in contact with each other, thereby requiring high machining accuracy for only a small guiding surface, and practically sufficient accuracies for other parts of the construction.

The fastening projections of the bracket are preferably formed at two locations, one at each location, and extend through the fitting holes on one side of the combination switch. The fastening hole is formed in the bracket on an opposite side from the fastening projections. Thus, when the combination switch is placed onto the bracket, the combination switch is accurately positioned at two locations by the fastening projections of the bracket. In addition, the three locations where the combination switch is positioned relative to the bracket can be separated as far from one another as possible to reliably support the apparatus.

The fastening projections of the bracket are preferably below the steering column, and the fastening hole of the bracket is above the steering column. With this construction, a simple insertion of the fastening projections of the bracket into the combination switch is required on the side below the steering column assembled to the vehicle body, and the only fastening operation using a fastening member is performed on the side above the steering column. This construction eliminates the uncomfortable assembly work in which the worker must climb into a space below the steering column, thereby improving the assembly efficiency.

The bracket is preferably integral with a key cylinder of an ignition key, thereby eliminating a mounting operation for a separate bracket to the steering column. This further improves the assembly efficiency.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENTS

Figure 1:
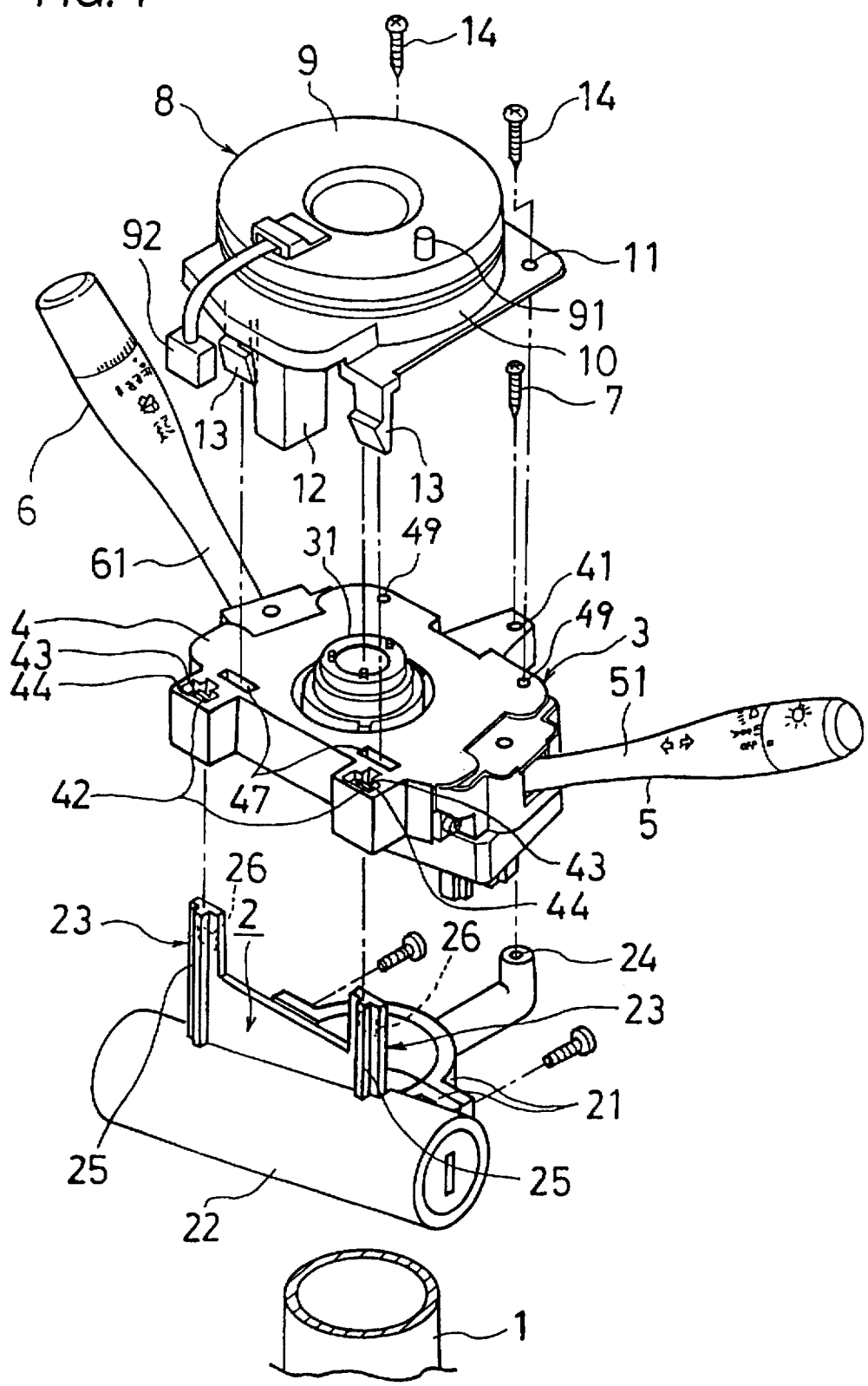
FIG. 1 is an exploded perspective view of a mounting construction for a combination switch according to a preferred embodiment of the present invention.
Figure 2:
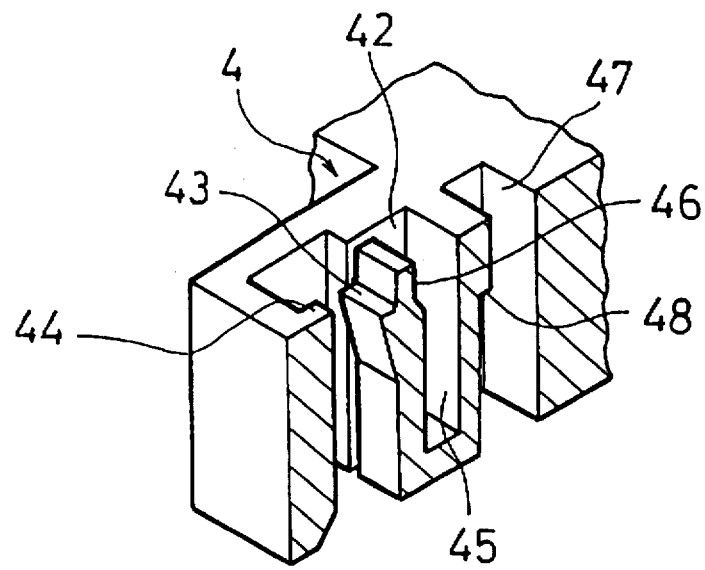
FIG. 2 is a fragmentary perspective view showing a relevant part of the mounting construction shown in FIG. 1.
Figure 3:
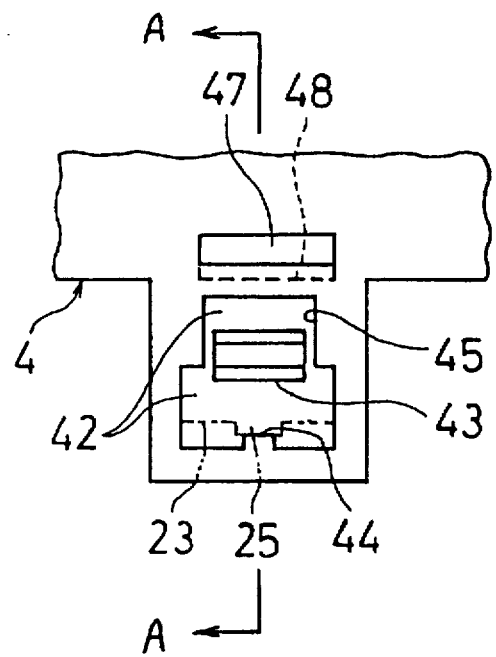
FIG. 3. is a top view showing a relevant part of the mounting construction shown in FIG. 1.
Figure 4:
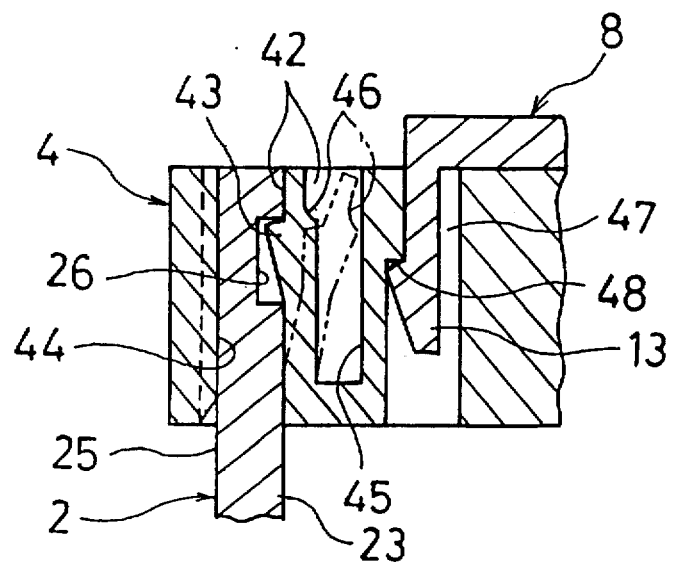
FIG. 4 s a cross-sectional view, taken along the line A—A of FIG. 3. showing a relevant part of the mounting construction shown in FIG. 1.

Preferred embodiments of the present invention will now be described with reference to FIGS. 1 to 5 of the accompanying drawings.

As shown in FIGS. 1 to 4, the mounting construction of the present invention is used to mount a combination switch 3 to a steering column 1 of an automobile using a bracket 2. The combination switch 3 includes a base 4, a turn signal switch 5, and a wiper switch 6. A rotatable connector 8 is mounted to the combination switch 3 for communicating electrical signals between the steering wheel and the vehicle body (not shown).

The bracket 2 includes a mounting member 21 for mounting the bracket 2 to the steering column 1, a key cylinder 22 of the ignition switch which is below the steering column 1, two fastening projections 23, 23 extending from the key cylinder 22 parallel to the steering column 1, and a threaded hole 24 which is above the steering column 1 and serves as a fastening hole. These structural elements of the bracket 2 are assembled in a unitary construction. The threaded hole 24 of the bracket 2 is formed in an end portion of an L-shaped projection extending substantially upwardly from the middle of the mounting member 21, and extends parallel to the steering column 1.

Longitudinal projections 25, 25 are formed on the underside and transversely in the middle of each of the fastening projections 23, 23. The longitudinal projections 25, 25 extend longitudinally of the fastening projections 23, 23 and serve as a first guide. Rectangular fastening recesses 26, 26 are formed in the top side of each of the fastening projections 23, 23. As shown, the recesses 26, 26 are portions that are engaged with resilient hooks 43, 43 on the combination switch 3. Alternatively, the recesses 26, 26 can be in the form of through-holes instead of recesses.

The base 4 of the combination switch 3 is of a generally trapezoidal shape having short and long sides parallel to each other. The base 4 is provided with a cylindrical cancel member 31 in the middle thereof. The cancel member 31 is a rotatable and causes the operating lever 51 of the turn signal switch 5 to automatically return to its original position. An insertion hole 41 is provided in the middle of the short side of the trapezoid, and two fitting holes 42, 42 are provided on the long side. The base 4 has engagement portions 47, 47 near the fitting holes 42, 42, the engagement portions 47, 47 being engaged with resilient fastening straps 13, 13 of the rotatable connector 8.

The fitting holes 42, 42 are through-holes which extend parallel to the steering column 1 and into which the fastening projections 23, 23 of the bracket 2 are fitted. As shown, the resilient hooks 43, 43 are formed in the fitting holes 42, 42 for engaging the recesses 26, 26 in the fastening projections 23, 23. The longitudinal projections 44, 44, which serve as a second guide, abut the first projections 25, 25 formed on the fastening projections 23, 23. The engagement portions 47, 47 engaged with the rotatable connector 8 are fastening holes having a step 48 formed in a wall thereof, the step 48 engaging the resilient fastening straps 13, 13 of the rotatable connector 8.

The resilient hooks 43, 43 are projecting strips formed in the fitting holes 42, 42. A space 45 is formed behind each of the projecting strips so that the resilient hooks 43, 43 can flex into the space 45. As shown, the resilient hooks 43, 43 each have a cut-away portion 46 on the upper end so that the resilient hooks 43, 43 flex as much as possible when the fastening projections 23, 23 are inserted into the fitting holes 42, 42. The resilient hooks 43, 43 engage the recesses 26, 26 formed in the fastening projections 23, 23, thereby preventing the combination switch 3 from coming off the bracket 2. The second longitudinal projections 44, 44 are formed on the inner wall of the fitting holes 42, 42, and extend longitudinally to engage the first longitudinal projections 25, 25 of the fastening projections 23, 23, thereby preventing the fastening projections 23, 23 from rattling in the fitting holes 42, 42 and positioning the combination switch 3 relative to the bracket 2.

The operating lever 51 of the turn signal switch 5 includes functions of, for example, a direction indicator, a lighting switch, a passing switch, and a main dimmer switch. The operating lever 61 of the wiper switch 6 has functions of, for example, a wiper-washer switch and a volume switch for driving the wiper intermittently. As shown in FIG. 1, the turn signal switch 5 and wiper switch 6 are fitted to the base 4 and bolted thereto.

A single bolt or screw 7 serves as a fastening member for securing the combination switch 3 to the bracket 2. The screw 7 extends through the insertion hole 41 in the base 4 and is threaded into the threaded hole 24 of the bracket 2.

The rotatable connector 8 is of a generally doughnut shape having a cable reel therein. The rotatable connector 8 includes a rotatable case 9 which is fastened to the steering wheel (not shown), and a fixed case 10 fixed to the base 4 of the combination switch 3.

The rotatable case 9 is provided with a projection 91 which projects upward from the top surface and engages a recess (not shown) formed in the underside of the steering wheel, and a connector 92 which is led out of the upper surface of the case 9. The connector 92 is connected to one end of the cable reel housed in the rotatable connector 8. The rotatable case 9 is rotatably assembled to the fixed case 10. The rotatable case 9 has its projection 91 fitted to the steering wheel, thereby rotating together with the steering wheel.

The fixed case 10 has insertion holes 11, 11 in alignment with the threaded holes 49, 49 formed in the base 4, a connector 12, and resilient fastening straps 13, 13. The connector 12 and resilient fastening straps 13, 13 project downwardly from the fixed case 10. The connector 12 is connected to the other end of the cable reel housed in the rotatable connector 8. The resilient fastening straps 13, 13 engage the engagement portions 47, 47 of the base 4. By having the resilient fastening straps 13, 13 engage the engagement portions 47, 47 in the base 4, the fixed case 10 can be set in position relative to the base 4 and then securely connected to the base 4 by means of two screws 14, 14. The resilient fastening straps 13, 13 are shorter than the thickness of the base 4 so that the tips of the resilient fastening straps 13, 13 will not project from the engagement portions 47, 47 when the resilient fastening straps 13, 13 engage the engagement portions 47, 47. A single or a plurality of resilient fastening straps 13, 13 may be provided at any locations.

The assembly process for the mounting construction according to the present invention, as described above, will now be described.

First, the bracket 2 is bolted to the steering column 1. Then, the fastening projections 23, 23 of the bracket 2 are fitted into the fitting holes 42, 42 in the base 4 of the combination switch 3. The first longitudinal projections 25, 25 abut the second longitudinal projections 44, 44, and the recesses 26, 26 engage the resilient hooks 43, 43 so that the bracket 2 is set in position relative to the base 4. This allows the insertion hole 41 of the base 4 to be aligned with the threaded hole 24 of the bracket 2. Then, the screw 7 is passed through the insertion hole 41 and threaded into the threaded hole 24, whereby the base 4 is firmly fixed to the bracket 2.

Then, the resilient fastening straps 13, 13 of the rotatable connector 8 are inserted into the engagement portions 47, 47 of the base 4 so that each of the resilient fastening straps 13, 13 engages a step 48 in one of the engagement portions 47, 47, thereby placing the rotatable connector 8 in a proper position relative to the base 4. Positioning the rotatable connector 8 relative to the base 4 allows the insertion holes 11 in the fixed case 10 to be aligned with the threaded holes 49, 49. The screws 14, 14 are then threaded into the threaded holes 49, 49 to securely fix the rotatable connector 8 to the base 4. This completes the assembly.

Figure 5:
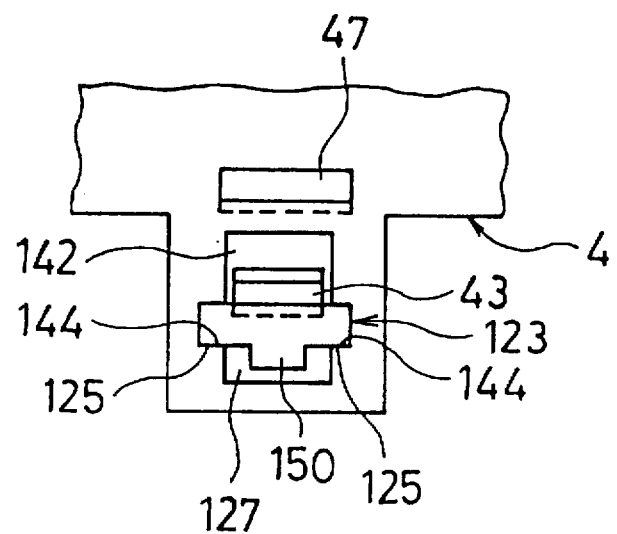
FIG. 5 is a top view, similar to that of FIG. 3, showing a relevant part of a mounting construction according to an alternative embodiment of the present invention.

In the preferred embodiment described above, the first and second guides are formed in the shape of a longitudinal projection formed on each of the fastening projections 23, 23 and in the wall of the fitting holes 42, 42, respectively. In an alternative embodiment, as shown in FIG. 5, the second guide 44 may be replaced by second guides 144 formed in the opposing walls of each of the fitting holes 142, and the first guides may be replaced by first guides 125 formed on the opposing sides of each of the fastening projections 123 that conform to the second guides 144. As in the first embodiment, the fastening projections 123 engage the fitting holes 142 only via their guiding portions (i.e., the first and second guides 125, 144). Therefore, only the guiding portions need to be manufactured with a high degree of accuracy when manufacturing the bracket and combination switch.

Also shown in FIG. 5 is a longitudinal projection 150 formed in the middle of the fastening projection 123. The longitudinal projection 150 is a rib for reinforcing the fastening projection 123. The space 127 in the fitting hole 142 is a clearance so that the longitudinal projection 150 will not be interfered by the wall of the fitting hole 142. The preferred embodiments have been described with reference to bolts or screws as fastening members, but any known fastening members may be used in place of bolts or screws.

If the projection having the threaded insertion hole 24 formed therein extends upwardly above the outer periphery of the rotatable connector 8, both the rotatable connector 8 and the combination switch 3 can be simultaneously assembled to the bracket 2 after preassembling the rotatable connector 8 and combination switch 3 together.

According to a first aspect of the present invention, the bracket 2 which is fixed to the steering column is provided with the fastening hole 24 and the fastening projections 23, 23 extending parallel to the steering column 1. The base 4 of the combination switch 3 is formed with the fitting holes 42, 42 into which the fastening projections 23, 23 are fitted and the insertion hole 41 that corresponds to the fastening hole 24. The combination switch 3 is fixed to the bracket 2 by inserting the fastening member 7 through the insertion hole 41 and fastening the fastening member 7 to the fastening hole 24. This assembly operation eliminates the need for the operator to hold the combination switch 3 and the bracket 2 in a provisionally aligned condition since they are fixedly assembled after positioning the combination switch 3 relative to the bracket 2 by means of the fastening projections 23, 23 and the fitting holes 42, 42. Moreover, the fastening member 7 is inserted in a direction parallel to the direction in which the combination switch 3 is inserted onto the bracket 2, and is fastened at a limited location, thereby improving assembly efficiency. Further, the fastening projections 23, 23 extending parallel to the steering column 1 allow the fastening projections 23, 23 to prevent the combination switch 3 from moving in upward, downward, and rotating directions in which the operating levers 51, 61 of the combination switch 3 are operated most often, thereby increasing the rigidity of the construction.

According to another aspect of the present invention, the fastening projections 23, 23 of the bracket 2 are each formed with the recess 26, and the fitting holes 42, 42 of the combination switch 3 each have the resilient hook 43 formed therein. The resilient hook 43 engages the recess 26. Therefore, when the fastening projections 23, 23 of the bracket 2 extend through the combination switch 3, the resilient hooks 43, 43 engage the fastening recesses 26, 26, thereby limiting the movement of the combination switch 3 in the axial direction. This ensures that the combination switch 3 and the steering column 1 are assembled together provisionally. The engagement of the combination switch 3 and the bracket 2 on the steering column 1 allows a positive fixing without using other fastening members, thereby ensuring a stable and reliable fixing of the combination switch 3.

According to another aspect of the present invention, the fastening projections 23, 23 of the bracket 2 are each formed with the first guide 25 on the side opposite from the side in which the recess 26 is formed. The second guide 44 is formed on the wall of the fitting hole 42 in the combination switch 3 so as to abut the first guide 25 when assembled. This construction allows the first and second guides 25, 42 to have small areas in contact with each other, thereby requiring high machining accuracy only for their guiding surfaces and practically sufficient accuracies for other parts. This minimizes the rattling of the assembly at a low cost.

According to another aspect of the present invention, the two fastening projections 23, 23 of the bracket 2 are formed to extend on one side of the combination switch 3, and the threaded hole 24 is formed at a location on the opposite side. Thus, inserting the fastening projections 23, 23 of the bracket 2 into the combination switch 3 ensures accurate positioning of the combination switch 3 at two locations. In addition, the three locations where the combination switch 3 is positioned relative to the bracket 2 can be separated as far from one another as possible to reliably support the combination switch 3.

According to yet another aspect of the present invention, the fastening projections 23, 23 of the bracket 2 are below the steering column 1, and the threaded hole 24 is above the steering column 1. With this construction, only a simple insertion of the bracket 2 into the combination switch 3 is required on the side below the steering column 1 assembled to the vehicle body, and the fastening operation using a fastening member 7 is only required on the side above the steering column 1. This construction eliminates the uncomfortable assembly work in which the worker must climb into a space below the steering column 1, thereby improving the assembly efficiency.

Moreover, the integral construction of the bracket 2 with the key cylinder 22 of the ignition key eliminates the mounting operation of a separate bracket to the steering column 1, thereby further improving the assembly efficiency.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. A mounting construction for mounting a combination switch to a steering column, comprising:

a bracket fixed to the steering column and having a fastening hole and fastening projections, the fastening hole and the fastening projections extending longitudinally parallel to the steering column;

a combination switch having fitting holes and an insertion hole formed in a base thereof, said fastening projections of said bracket extending into the fitting holes of the combination switch, and the insertion hole of the combination switch corresponding to the fastening hole of the bracket; and a fastening member inserted through the insertion hole of the combination switch and fastened to the fastening hole of the bracket.

2. The mounting construction according to claim 1, wherein the fastening projections of the bracket are each formed with a fastening recess therein, and a resilient hook is formed in a wall of each of the fitting holes formed in the combination switch, the resilient hook engaging the fastening recess.

3. The mounting construction according to claim 2, wherein the fastening projections of the bracket are each formed with a first guide extending longitudinally on an opposite side of the projection from the fastening recess, and a second guide is formed on a wall of each of the fitting holes in the combination switch, the second guide abutting the first guide.

4. The mounting construction according to claim 3, wherein said fastening projections are formed at two locations, one at each location, on the bracket and extend into said fitting holes on one side of the combination switch, and the fastening hole is formed at a location on an other side of the combination switch opposite to the side where the fastening projections are formed.

5. The mounting construction according to claim 4, wherein the fastening projections of the bracket are below the steering column, and the fastening hole of the bracket is above the steering column.

6. The mounting construction according to claim 5, wherein the bracket is integral with a key cylinder of an ignition key.

7. The mounting construction according to claim 1, wherein the fastening projections of the bracket are each formed with a first guide extending longitudinally along one side of each of the fastening projections, and a second guide is formed on a wall of each of the fitting holes in the combination switch, the second guide abutting the first guide.

8. The mounting construction according to claim 1, wherein said fastening projections are formed at two locations, one at each location, on the bracket and extend through said fitting holes on one side of the combination switch, and the fastening hole is formed at a location on an other side of the combination switch opposite to the side where the fastening projections are formed.

9. The mounting construction according to claim 1, wherein the fastening projections of the bracket are below the steering column and the fastening hole of the bracket is above the steering column.

10. The mounting construction according to claim 1, wherein the bracket is integral with a key cylinder of an ignition key.

* * * * *